United States Patent [19]

Yoshizawa

[11] Patent Number: 4,776,071
[45] Date of Patent: Oct. 11, 1988

[54] CONVEYOR ROLLER FOR ROLLER CONVEYOR IN GLASS SHEET PROCESSING SYSTEM

[75] Inventor: Hideo Yoshizawa, Osaka, Japan

[73] Assignee: Nippon Sheet Glass Co., Ltd., Osaka, Japan

[21] Appl. No.: 8,824

[22] Filed: Jan. 30, 1987

[30] Foreign Application Priority Data

Feb. 7, 1986 [JP] Japan .................. 61-16416[U]

[51] Int. Cl.⁴ .................................. B21B 27/00
[52] U.S. Cl. ........................ 29/131; 29/130; 29/132
[58] Field of Search ............. 29/127, 130, 132, 131; 65/374.1, 374.11, 374.13, 253, 245; 432/246, 236

[56] References Cited

U.S. PATENT DOCUMENTS

| | | | |
|---|---|---|---|
| 3,763,533 | 10/1973 | Blom et al. ............... | 65/374.1 |
| 3,815,197 | 6/1974 | Sukenik ..................... | 29/132 |
| 3,852,862 | 12/1974 | Sukenik ..................... | 29/132 |
| 4,244,781 | 1/1981 | Heckman .................. | 65/374.13 |
| 4,246,313 | 1/1981 | Stergle, Jr. ............... | 65/374.1 |
| 4,272,274 | 6/1983 | Frank et al. . | |
| 4,397,673 | 8/1983 | Stevens ..................... | 29/132 |
| 4,421,482 | 12/1983 | McMaster . | |
| 4,525,196 | 6/1985 | Fecik et al. ............... | 29/132 |
| 4,533,581 | 8/1985 | Asaumi et al. ............ | 65/374.13 |

FOREIGN PATENT DOCUMENTS

58-3978 1/1983 Japan .
58-13502 3/1983 Japan .

Primary Examiner—P. W. Echols
Assistant Examiner—Irene Cuda
Attorney, Agent, or Firm—Bogucki, Scherlacher, Mok & Roth

[57] ABSTRACT

A conveyor roller for use in a roller conveyor for conveying a heated glass sheet in a glass sheet processing system includes an elongated core rotatable by driver means, and a support body made of a felt material comprising fibers of at least one type which is mechanically strong and/or resistant to heat, the support body being mounted on and disposed around an outer peripheral surface of the core for supporting the glass sheet. The felt material comprises a base woven web of glass fibers, 10 to 50 wt % of aramid fibers and 50 to 80 wt % of carbon fibers which are by needling intertwined with each other and with the base woven web.

9 Claims, 3 Drawing Sheets

CONVEYOR ROLLER FOR ROLLER CONVEYOR IN GLASS SHEET PROCESSING SYSTEM

BACKGROUND OF THE INVENTION

1. Field of the Invention

The present invention relates to a glass sheet processing system, and more particularly to a conveyor roller for a roller conveyor for conveying a heated glass sheet in such a glass sheet processing system.

2. Description of the Relevant Art

Systems for producing curved tempered glass sheets for use as window glass sheets on motor vehicles such as automobiles are disclosed in Japanese Patent Publications Nos. 58/3978 and 58/13502 and U.S. Pat. Nos. 4,272,274 and 4,421,482, for example. One typical method of shaping such a sheet glass includes the steps of heating a flat sheet to the softening point of glass at a heating station, shaping the heated glass sheet to a desired curvature at a shaping station, and then quenching the shaped glass sheet in a controlled manner to a temperature below the tempering temperature range of glass at a quenching station. The glass sheet heated at the heating station is delivered substantially horizontally to the shaping station by a plurality of conveyor rollers of a roller conveyor. The shaped sheet glass is likewise conveyed from the shaping station to the quenching station by a plurality of horizontal conveyor rollers spaced at intervals in the direction of feed. Each of these conveyor rollers comprises a core made of a ceramic material and a sleeve of glass fibers or aromatic polyamide fibers sold by E. I. Dupont de Nemours & Co., U.S.A. under registered U.S. trademark "Kevlar", the sleeve being wound around the core and attached at opposite ends to the core by an adhesive tape, as disclosed in U.S. Pat. No. 4,421,482. Japanese Patent Publication No. 58/13502 discloses another conveyor roller in which a sleeve of asbestos is fitted over a hollow core. The materials of the sleeve serve to make the conveyor roller resistant to heat. Use of the Kevlar fibers is advantageous in that their low thermal conductivity is effective in preventing chill cracking of a glass sheet conveyed by the conveyor rollers.

The conventional sleeves of the conveyor rollers have been in the form of woven cloth that causes some drawbacks. One of the shortcomings is that the woven cloth tends to leave cloth marks on the surface of the glass sheet being delivered by the conveyor rollers. The glass sheet therefore has small surface irregularities which are responsible for optical defects. The glass surface irregularities could be reduced by employing thinner fibers for the sleeve cloth. The sleeve cloth of thinner fibers would however become less durable and might be broken in use. Another deficiency is that when the sleeve cloth is cut off or broken by a glass edge or a broken glass piece, the sleeve cloth is unraveled progressively from the cut or broken region.

SUMMARY OF THE INVENTION

It is an object of the present invention to provide a conveyor roller for a roller conveyor in a glass sheet processing system, the conveyor roller being designed to minimize the formation of optical defects in a glass sheet being delivered by the conveyor roller.

Another object of the present invention is to provide a conveyor roller for a roller conveyor in a glass sheet processing system, the conveyor roller being highly durable and resistant to heat.

To achieve the above objects, there is provided in accordance with the present invention a conveyor roller for use in a roller conveyor for conveying a heated glass sheet in a glass sheet processing system. The roller includes an elongate core rotatable by driver means, and a support body made of a felt material comprising fibers of at least one type which is mechanically strong and resistant to heat, the support body being mounted on and disposed around an outer peripheral surface of the core for supporting the glass sheet.

According to an example, the felt material comprises a base woven web of glass fibers, 10 to 50 wt % of aramid fibers and 50 to 80 wt % of carbon fibers. The aramid fibers and carbon fibers which are to be intertwined by needling with each other and with the base woven web.

According to another example, the felt material comprises a base woven web of glass fibers, 50 wt % of aramid fibers, 30 wt % of carbon fibers and 20 wt % of stainless steel fibers. The three kinds of fibers are interwined by needling with each other and with said base woven web on opposite surfaces thereof. It is preferable that those fibers of the felt material which contact the glass sheet be highly heat-resistant and wear-resistant, and that those fibers contacting the core be of high mechanical strength.

The diameter of each of the fibers used is in the range of from 2 to 18 microns, and more preferably 10 microns. The felt material is of a thickness ranging from 3 to 10 mm in view of desired durability, but should not be too thick because it would not be uniform in thickness. The support body may be in the form of a sleeve fitted over the core or an elongate tape helically wound around and bonded to the core.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
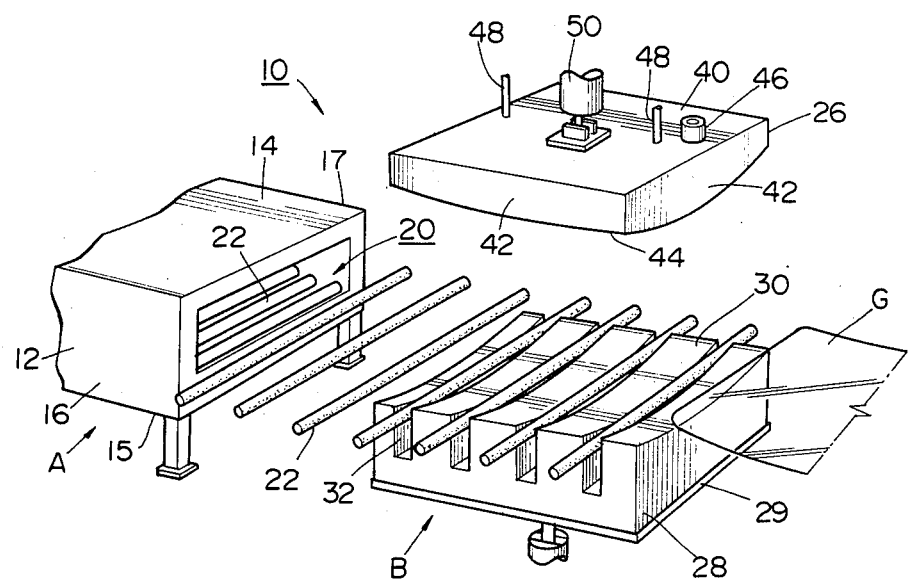
FIG. 1 is a fragmentary perspective view of a glass sheet processing system employing conveyor rollers according to the present invention.

As shown in FIG. 1, a glass sheet processing system, generally designated by the reference numeral 10, comprises a heating station A, a shaping station B, and a quenching station (not shown). The heating station A includes a heating furnace 12 having a tunnel-like channel defined by upper and lower walls 14, 15 and lateral side walls 16, 17. The channel of the heating furnace 12 houses therein a roller conveyor 20 comprising a plurality of conveyor rollers 22 spaced horizontally at regular intervals in a direction of feed through the heating furnace 12. A glass sheet G is supported horizontally on the conveyor rollers 22 in the heating furnace 12 while the glass sheet G is being heated by a suitable heating means (not shown) to the softening point of glass. The roller conveyor 20 extends horizontally also in the shaping station B. The conveyor rollers 22 are rotated at a controlled speed by an electric motor (not shown).

Figure 2:
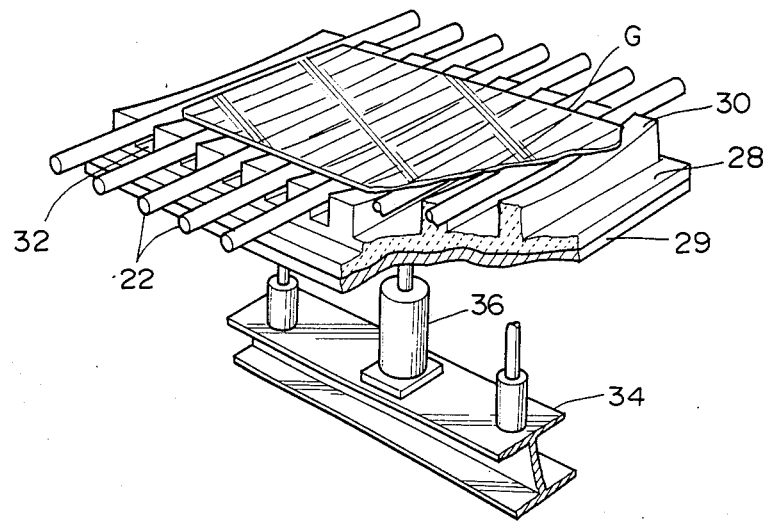
FIG. 2 is a perspective view, partly broken away, of a lower mold member, as it is lowered, of the glass sheet processing system shown in FIG. 1.
Figure 3:
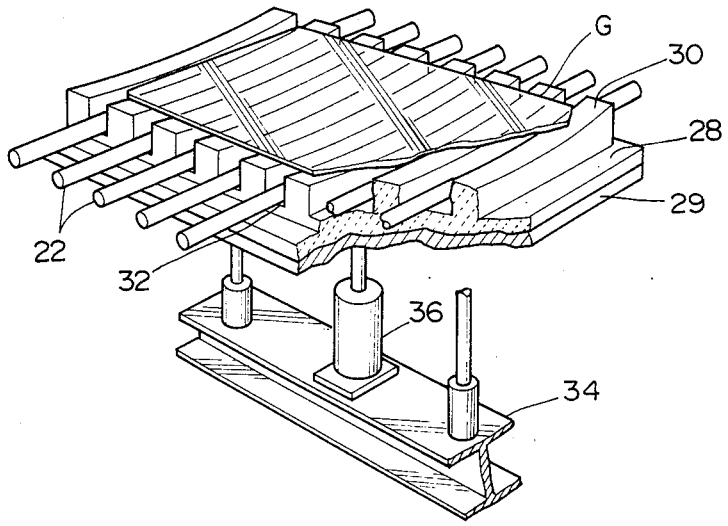
FIG. 3 is a view similar to FIG. 2, showing the lower mold member as it is elevated.

As illustrated in FIGS. 1 through 3, the shaping station B is positioned adjacent to the heating station A and comprises an upper mold member 26 of metal covered with a fire-resistant material such as glass fibers and a lower mold member 28 made of a fire-resistant material. The material of the lower mold member 28 should preferably be durable enough to withstand cyclic temperature variations because the upper surface thereof will be kept in intermittent contact with high-temperature glass for a long period of time. The lower mold member 28 is detachably secured by bolts (not shown) to a support 29 in the form of a plate of aluminum. Therefore, the lower mold member 28 may be replaced with another differently shaped lower mold member for producing a glass sheet of different shape.

The lower mold member 28 has a smooth shaping surface 30 on its upper surface for shaping the glass sheet G conveyed from the heating station B. The lower mold member 28 has a plurality of transvere grooves 32 defined in the upper surface thereof and spaced at the same regular intervals in the direction of movement of the glass sheet G as those of the conveyor rollers 22 in the shaping station B. The transverse grooves 32 are in vertical alignment with some of the successive conveyor rollers 22 in the shaping station B. Therefore, when the lower mold member 28 is moved from a lowered position of FIG. 2 to an elevated position of FIG. 3 by a vertical actuator 36 fixedly mounted on a support base 34, the conveyor rollers 22 are fully disposed in the respective transverse grooves 32.

As shown in FIG. 1, the upper mold member 26 comprises an upper wall 40, side walls 42, and a lower wall 44 shaped complementarily to the upper surface of the lower mold member 28. The upper mold member 26 has an internal vacuum chamber (not shown) communicating with a source of vacuum (not shown) through an evacuation pipe 46 and a suitable valve (not shown). The lower wall 44 has suction holes defined therein communicating with the internal vacuum chamber. The upper mold member 26 is operatively coupled to a support frame (not shown) through guide rods 48 and vertically movable with respect to the support frame by means of a vertical actuator 50. The upper mold member 26 is also replaceable with another upper mold member of different shape.

The glass sheet H as it is delivered by the conveyor rollers 22 from the heating furnace 12 is placed on the conveyor rollers 22 in the shaping station B as shown in FIG. 2. Then, the lower mold member 28 is moved to the elevated position by the vertical actuator 36 for enabling the shaping surface 30 to contact and displace the glass sheet G off the conveyor rollers 22. Now, the upper mold 26 is lowered toward the shaping surface 30 by the vertical actuator 50 and pressed against the glass sheet G, which is curved to a desired curvature between the upper and lower molding members 26, 28. After the glass sheet G has been shaped, the internal vacuum chamber of the upper mold member 26 is evacuated to attract the glass sheet G to the lower wall 44 of the upper mold member 26. Thereafter, the lower mold member 28 is moved to the lowered position of FIG. 2. The glass sheet G remains attracted under suction to the lower wall 44 of the upper mold member 26. A conveyor ring (not shown) is then positioned below the upper mold member 26, and the vacuum in the internal vacuum chamber of the upper mold member 26 is removed to allow the glass sheet G to be placed on the conveyor ring, which is thereafter moved to the quenching station located downstream of the shaping station B in the direction of travel of the glass sheet G. The glass sheet G is rapidly cooled in the quenching station by a suitable coolant down to a temperature blow the tempering temperature range of glass, so that a desired stress is imparted to the glass sheet G.

The glass sheet processing system described above with reference to FIGS. 1 through 3 is of a general nature and disclosed in detail in U.S. Pat. No. 4,272,274. The present invention is particularly directed to an improvement in the conveyor rollers 22 of the roller conveyor 20.

Figure 5:
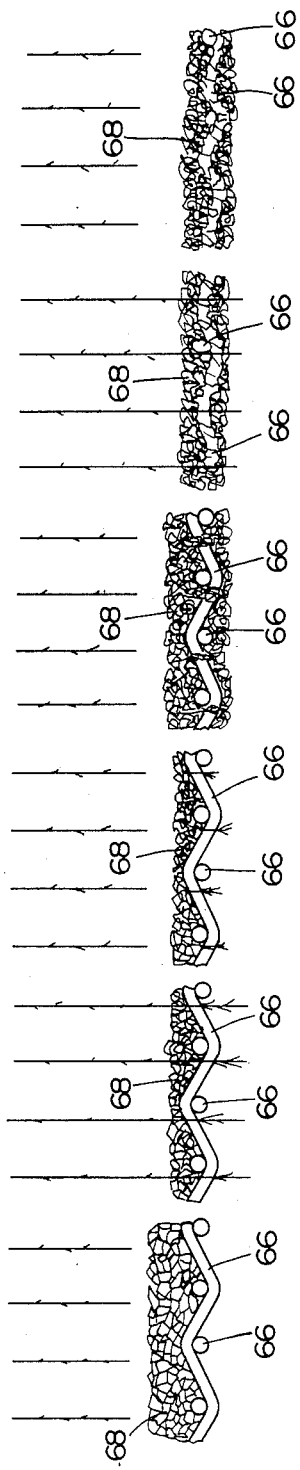
FIG. 5 is a view showing a process of producing a felt material.
Figure 4:
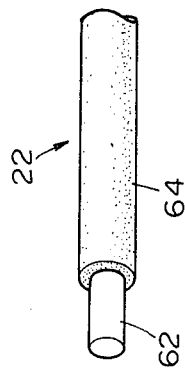
FIG. 4 is an enlarged fragmentary perspective view of a conveyor roller according to the present invention.

As shown in FIG. 4, a conveyor roller 22 according to the present invention comprises an elongated core 62 and a sleeve or support body 64 of a felt material fitted over and bonded to the core 62 by a suitable means such as an adhesive, for example. The core 62 is made of a ceramic material or steel in order to withstand heat in the heating furnace 12, the interior of which is normally heated to a temperature range from about 650° C. to 700° C. during operation. As shown in FIG. 5, the felt sleeve 64 is fabricated by placing fibers 68 which are highly heat-resistant, wear-resistant, and/or mechanically strong on one or opposite surfaces of a woven base web 66 of glass fibers, by needling the fibers 68 to cause them to be intertwined with themselves and the base web 66 at its opposite surfaces, and by then winding the needled felt into a sleeve-like configuration. The needling processes passes a barbed needle through the fibers and woven base web 66 at multiple points on the base web 66. The barbs are oriented to carry the fibers through the base web 66 upon insertion of a needle while permitting easy extraction of a needle. The base web 66 may be made of fibers such as polyester fibers or nylon fibers. The fibers 68 combined with the base web 66 may be aramid fibers, carbon fibers, metallic fibers, silica fibers, alumina fibers, asbestos fibers, or the like. As one example, the fibers 68 may contain 10 to 50 wt % of aramid fibers and 50 to 80 wt % of carbon fibers, and more preferably 30 wt % of aramid fibers and 70 wt % of carbon fibers. The diameter of each of these fibers is in the range of from 2 to 18 microns, and more preferably 10 microns. The felt material of the sleeve 64 is of a thickness ranging from 3 to 10 mm in view of desired durability, but should not be too thick because it would not be uniform in thickness.

According to another example, three or more types of fibers are disposed as layers on each surface of the base web 66. More specifically, aramid fibers (50 wt %), carbon fibers (30 wt %), and then stainless steel fibers (20 wt %) are placed on the base web 66 in the order named, and then needled, thereby producing a felt material. Other fibers specified above may also be employed. In such a case, it is preferable that fibers of high heat resistance and wear resistance be positioned at the surface of the felt material which will contact a glass sheet, and that fibers of high mechanical strength be positioned in contact with the core.

Figure 6:
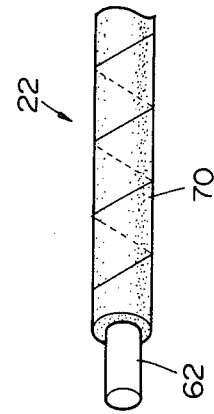
FIG. 6 is an enlarged fragmentary perspective view of an alternative conveyor roller according to the present invention.

FIG. 6 shows a conveyor roller 22 according to another embodiment. In this embodiment, a felt material 70 in the form of an elongated tape is helically wound around the core 62. The felt material 70 is bonded to the core 62 by an adhesive.

Figure 7:
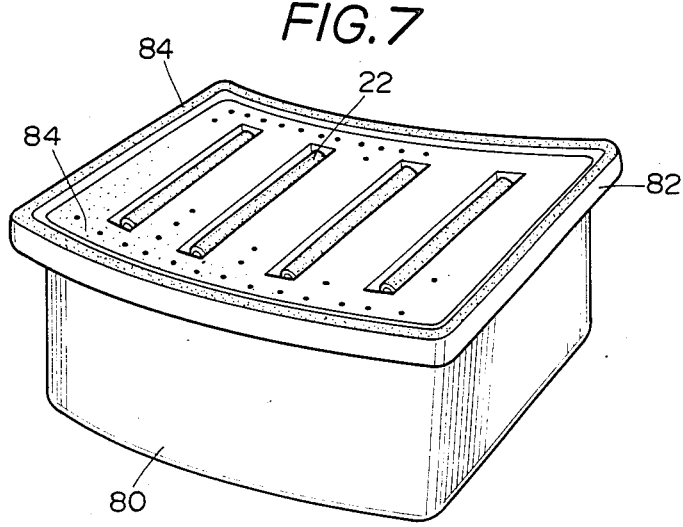
FIG. 7 is a perspective view of a glass sheet processing device, different from the system of FIG. 1, with a felt material attached thereto in accordance with the invention.

In FIG. 7, a glass sheet shaping device 80 of a glass sheet processing system has a ring mold 82 disposed on an upper peripheral edge thereof for shaping the peripheral edge of a glass sheet. A felt material 84 formed in the manner described above is applied to the entire upper surface of the glass sheet shaping device 80 including the upper surface of the ring mold 82. The glass sheet shaping device 80 can produce a sheet glass suffering from few optical defects.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A conveyor roller for use in a roller conveyor for conveying a heated glass sheet in a glass sheet processing system, comprising:
   an elongated core rotatable by drive means; and
   a support disposed on the outer peripheral surface of the core for supporting the glass sheet;
   said support being made of a felt material comprising a plurality of fibers, at least one of which being mechanically sufficiently strong to support the heated glass sheet and sufficiently resilient to heat to withstand the heat of the glass sheet, said felt material comprising a base woven web of glass fibers, 10 to 50 wt % of aramid fibers, and 50 to 80 wt % of carbon fibers, the fibers being intertwined with each other and with said base woven web.

2. A conveyor roller according to claim 1, wherein the glass and aramid fibers are needled into intertwined relationship with each other and with the base woven web.

3. A conveyor roller according to claim 1, wherein each of said aramid and carbon fibers has a diameter in the range of 2 to 18 microns.

4. A conveyor roller according to claim 1, wherein said felt material has a thickness in the range of 3 to 10 mm.

5. A conveyor roller according to claim 1, wherein said felt material is in the form of a sleeve bonded onto said core by an adhesive.

6. A conveyor roller according to claim 1, wherein said felt material is in the form of an elongated tape helically wound around the bonded onto said core.

7. A conveyor roller for use in a roller conveyor for conveying a heated glass sheet in a glass sheet processing system, comprising:
   an elongated core rotatable by drive means; and
   a support disposed on the outer peripheral surface of the core for supporting the glass sheet;
   said support being made of a felt material comprising a plurality of fibers, at least one of which being mechanically sufficiently strong to support the heated glass sheet and sufficiently resilient to heat to withstand the heat of the glass sheet, said felt material comprising a base woven web of glass fibers, aramid fibers, carbon fibers and stainless steel fibers, the fibers being intertwined with each other and with said base woven web.

8. A conveyor roller according to claim 7, wherein said aramid fibers are 50 wt %, carbon fibers are 30 wt % and stainless steel fibers are 20 wt %.

9. A conveyor roller according to claim 7 wherein said glass, aramid, carbon and stainless steel fibers are needled into intertwined relationship with each other and with the base woven web.

* * * * *